2,925,429
CHEMICAL COMPOSITIONS

Willard H. Kirkpatrick, Sugar Land, and Alice Walker, Houston, Tex., assignors to Visco Products Company, Houston, Tex., a corporation of Delaware No Drawing. Original application September 30, 1950, Serial No. 187,824. Divided and this application July 12, 1954, Serial No. 442,897

14 Claims. (Cl. 260—404.8)

This invention relates to new and improved chemical compositions and more particularly to new and improved chemical compositions containing both hydrophobe and hydrophile groups.

An object of the invention is to provide new and useful compositions which have a hydrophile-hydrophobe balance which makes them especially useful as demulsifiers for water-in-oil petroleum emulsions and for other uses where such a hydrophile-hydrophobe balance is necessary or desirable.

The compositions of the present invention are reaction products of castor oil, an organic dicarboxy acid and a polyoxyalkylene compound, preferably having a molecular weight of at least 1700, which may be either a glycol or a monoether of a glycol and in which the oxyalkylene groups consist essentially of oxyethylene and oxypropylene groups (e.g., oxy-1,2-propylene) wherein the weight ratio of oxyethylene to oxypropylene is at least 1:4 and does not exceed 4:1.

The order of the reactions does not appear to be important but is is usually preferable to react the castor oil with the dicarboxy acid first and then to react the resultant product with the polyoxyalkylene compound. The reactions are carried out under conditions facilitating the elimination of an aqueous distillate.

The proportions of the reactants may vary but, in general, the molar ratio of the dicarboxy acid to castor oil should be at least 1:3 and the molar ratio of the polyoxyalkylene compound to castor oil likewise should be at least 1:3.

The temperatures of reaction will normally be within the range of 150° C. to 300° C.

The reaction is preferably carried out sufficiently long to eliminate the major proportion of the water formed at the reaction temperatures but short of the formation of a solid gel.

The reaction products have a relatively high molecular weight. For the best results in breaking petroleum emulsions polyoxyalkylene compounds having a molecular weight within the range from about 1700 to about 7500 have been employed in preparing the desired products.

It has been discovered that these compositions have unusual and unexpected properties for resolving water-in-oil emulsions into their component parts. One possible theory which may be postulated for the striking effectiveness of these compositions in resolving petroleum emulsions is hydrophobe-hydrophile balance which has not been secured heretofore with compositions well known in this art.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

EXAMPLE I

In a suitable reaction vessel there was introduced 4480 parts of castor oil and 950 parts of technical diglycolic acid. The temperature was raised with agitation until an aqueous distillate began to form at a temperature of about 150° C. The heating was continued until 166 parts of an aqueous distillate had been secured at a maximum temperature of about 170° C. The reaction mass was then cooled to 145° C. and condensed at this temperature for 4 hours. Approximately 5400 parts of a composition known in the trade as Ucon 50–HB–660 and about 1080 parts of a suitable hydrocarbon fraction such as $SO_2$ extract were added to the above intermediate. Ucon 50–HB–660 is the monobutyl ether of a heteric polyalkylene glycol, the polyoxyalkylene chain of which contains ethylene oxide and propylene oxide in a 1:1 ratio, the molecular weight of the monoether being approximately 1700. After the addition of these materials the temperature of the reaction mass is gradually increased until a second aqueous distillate began to form. The heating was continued until a total of about 42 parts of aqueous distillate was secured. The formation of the distillate began at approximately 185° C. and the required amount was secured at a maximum temperature of about 230° C. After cooling to approximately 140° C. 2880 parts of a suitable hydrocarbon fraction was added and agitated for 45 minutes to yield the finished product.

EXAMPLE II

In a suitable reaction vessel 930 parts of castor oil and 201 parts of technical diglycolic acid were heated until 36 parts of an aqueous distillate had been secured. After the aqueous distillate was secured the reaction mass was permitted to condense an additional 2 hours at 120° C. To 220 parts of this intermediate there was added 170 parts of Ucon 50–HB–660 and 50 parts of a suitable hydrocarbon fraction such as $SO_2$ extract. The mixture was then heated with agitation and at approximately 218° C. an aqueous distillate began to form and heating was continued until approximately 2 parts of aqueous distillate was secured at a maximum temperature of 253° C. The mass was cooled to 140° C. and 400 parts of $SO_2$ extract added with agitation to yield the finished product.

EXAMPLE III

In a suitable reaction vessel provided with means of agitation, heating and removal of aqueous distillate with simultaneous return of azeotropic distillate to the reaction mass there was added 630 parts of castor oil and 148 parts of phthalic anhydride. These materials were heated and condensed for 7 hours at a temperature of 140° to 155° C. To 250 parts of this intermediate there was added 250 parts of Ucon 50–HB–660 and 50 parts of $SO_2$ extract. The reaction mass was heated to 220° C. An aqueous distillate began to form and heating was continued for 2 hours at a maximum temperature of 258° C. Approximately 3 parts of aqueous distillate was secured under these conditions. The reaction mass was cooled to 140° C. and about 660 parts of $SO_2$ extract was added with stirring to yield the finished product.

EXAMPLE IV

Under similar conditions to those described in Example III, 930 parts of castor oil and 268 parts of technical diglycolic acid were heated with agitation until a total of 36 parts of aqueous distillate was secured. This reaction began at 159° C. and was complete after approximately 2 hours at a maximum temperature of 172° C. The heat was then reduced to 150° C. and the mass condensed at that temperature for 4 hours. To 116 parts of the above intermediate there were added 500 parts of Ucon 50–HB–5100 and 100 parts of $SO_2$ extract. Ucon 50–HB–5100 is a monobutyl ether of a heteric polyoxyalkylene glycol in which ethylene oxide and propylene oxide are present in a ratio of 1:1 and the molecular weight is approximately 5000. The reaction mixture was heated with agitation and at 197° C. an aqueous distillate began to form and heating was continued until a total of 2.2 parts of aqueous distillate had been secured at a maximum temperature of 245° C. The reaction mass was cooled to approximately 140° C. and 1325 parts of $SO_2$ extract was added with agitation to yield the finished product.

EXAMPLE V

The procedure of Example IV was repeated with the exception that 19 parts of Ucon 75–H–135 was used in place of the Ucon 50–HB–5100. Ucon 75–H–135 is a heteric polyoxyalkylene glycol in which the ethylene oxide to propylene oxide ratio is 3:1 and the molecular weight is approximately 325. Also, in this example only 400 parts of $SO_2$ extract was used in the final step to yield the finished product.

EXAMPLE VI

Under similar conditions described in Example III, 315 parts of castor oil and 67 parts of technical diglycolic acid were heated to secure 9.2 parts of an aqueous distillate. This reaction required approximately 80 minutes at a temperature of 162° to 180° C. The heat was then lowered to 150° C. and condensation permitted to occur at this temperature for an additional 5 hours. To 100 parts of this intermediate there was added 130 parts of Ucon 75–H–1400 and 50 parts of $SO_2$ extract. Ucon 75–H–1400 is a heteric polyoxyalkylene glycol in which the ethylene oxide to propylene oxide ratio is 3:1 and the molecular weight is approximately 2200. These reactants were heated over the range from 197° C. to 240° C. during which 1.1 parts of aqueous distillate was secured. The reaction mass was cooled to approximately 140° C. and 325 parts of $SO_2$ extract added with stirring to yield the finished product.

EXAMPLE VII

Under similar conditions to those described in Example III, 110 parts of castor oil, diglycolic acid intermediate as prepared in accordance with Example II, 50 parts of Ucon 75–H–135 and 20 parts of $SO_2$ extract were mixed with heating. The temperature was held at 150° C. for 2 hours and then gradually raised until an aqueous distillate began to form at 182° C. Heating was continued for 2 hours and a maximum temperature of 276° C. During this reaction time 2.7 parts of an aqueous distillate was secured. The reaction mass was cooled to 140° C. and 190 parts of $SO_2$ extract added with stirring to yield the finished product.

EXAMPLE VIII

Under conditions similar to those described in Example III, 189 parts of castor oil and 40 parts of technical diglycolic acid were heated to lose 7.2 parts of an aqueous distillate. This reaction required approximately 3.5 hours at an initial temperature of 140° C. and a maximum temperature of 228° C. To this intermediate there was added 370 parts of Ucon 25–HDG and 50 parts of $SO_2$ extract. Ucon 25-HDG is a heteric polyoxyalkylene glycol having an ethylene oxide to propylene oxide ratio of 1:3 and a molecular weight of about 3000. These reactants were heated for approximately 0.5 hours between 220° C. and 250° C. During this interval 1.9 parts of aqueous distillate were secured. The reaction mass was cooled to approximately 140° C. and 300 parts of $SO_2$ extract were added to yield the finished product.

In the foregoing examples, the quantities are given in parts by weight. Examples I, II, III, IV, VI and VIII, the average molecular weight of the product attributable to the polyoxyalkylene compound is at least 1700. Within the limits previously defined, any of the diols described in U.S. Patent 2,425,845 and any of the monoethers described in U.S. Patent 2,448,664 may be substituted for the respective diols and monoethers in the foregoing examples.

By way of illustrating the remarkable effectiveness of the products contemplated by this invention, the method of testing their efficiency in bottle tests will be described and exemplary data given, and this will be followed by the results of a full scale plant test.

Field bottle test I

| | |
|---|---|
| State of | Arkansas. |
| Oil field | Smart. |
| Oil company | R. H. Crow Drilling. |
| Lease | Taylor. |
| Well | B–1. |
| Percent emulsion in fluid from the well | 65. |
| Percent water in the fluid from the well | 0. |
| Percent water obtained by complete demulsification | 54. |
| Temperature of test | 150° F. |
| Manual agitation | 50 hot shakes, 200 cold shakes. |
| Treating ratio | 1/5,000. |

One hundred (100) cc. samples of the emulsion were taken and placed in conventional field test bottles. Various treating chemicals were added to the bottles at a ratio of 1 part chemical to 5,000 parts emulsion fluid. After the test chemical was added the samples which were placed in the test bottles were shaken 200 times at atmospheric temperature and subsequently agitated an additional 50 times at a treating temperature of 150° F. After shaking in each instance the water-drop was determined and recorded, that is to say, the amount of water which separated from the emulsion. The color of the oil was also observed and recorded at the same time. After agitation at elevated temperature, the samples were maintained at 150° F. for a total of 60 minutes to permit settling and stratification of the water.

The emulsion sample was secured just after the oil came from the well and every effort was made to maintain conditions comparable to those present in a full scale plant treatment. After agitation the samples were allowed to settle and were tested for water-drop at predetermined periods of time and recorded on suitable test sheets. The test showed that the composition as prepared in accordance with instructions of Example II released 27 parts of water after cold agitation. After the bottles had reached treating temperature of 150° F. the composition of Example II had dropped 50 parts of water and after standing 60 minutes at treating temperature the water-drop increased slightly. The color of the oil using Example II composition was excellent. The treated oil contained no residual emulsion whereas the chemical being used commercially in the plant system showed 1.2 parts of emulsion remaining which had not been resolved.

Field bottle test II

| | |
|---|---|
| State of | Texas. |
| Oil field | Forsan. |
| Oil company | Continental. |
| Lease | Eason. |
| Well | No. 1. |
| Percent emulsion in fluid from the well | 55. |
| Percent water in the fluid from the well | 10. |
| Percent water obtained by complete demulsification | 43. |
| Temperature of test | Atmospheric. |
| Manual agitation | 200 cold shakes. |
| Treating ratio | 1/33,300. |

Using the procedure similar to that described in Field bottle test I, without treating with external heat, tests were made with compositions as prepared in Example I and II. Both gave good color to the resolved oil which indicated substantial resolution. At the indicated treating ratio, Examples I and II compositions dropped approximately 25 parts of the recoverable water after standing 10 minutes. After 20 minutes' standing approximately 35 parts of water had separated. Upon additional standing substantially all of the recoverable water had separated. The treated oil with Example I and II compositions met pipeline specifications and could be successfully used in commercial scale operations.

Field bottle test III

| | |
|---|---|
| State of | Arkansas. |
| Oil field | Shuler. |
| Oil company | Lion. |
| Lease | C. |
| Wells | No. 16, 17. |
| Percent emulsion in fluid from the well | 60. |
| Percent water in the fluid from the well | 4. |
| Percent water obtained by complete demulsification | 39. |
| Temperature of test | 140° F. |
| Manual agitation | 200 cold shakes, 100 hot shakes. |
| Treating ratio | 1/10,000. |

Using the procedure similar to that described in Field bottle test I, tests were made using compositions as prepared in Examples I and II. Both gave excellent color to the resolved oil indicating substantial breaking of the emulsion. After 10 minutes at treating temperature of 140° F. 20 parts of water had stratified and upon standing an additional 20 minutes all of the water had stratified and the treated oil showed trace or less emulsion and water present. Under identical conditions, the chemical being used commercially dropped only 5 parts of water after 10 minutes' standing and 35 parts after an additional 20 minutes' standing. The oil layer with this chemical contained 16% emulsion and 1.2% water.

Field plant scale test

This test was made by actually treating the oil coming from the well described in Field bottle test III. A National heater treater was being used with a chemical proportioning pump to add the chemical treating reagent.

The treating agent employed was prepared in accordance with the directions of Example II. The plant test was started at 8:00 a.m. and was observed continuously until 1:00 p.m. of the following day. During this plant test an average of 26 pints of chemical was used during a 24 hour period. In this 24 hour period 1200 barrels of substantially dry oil were produced. During this test the treated oil met pipeline specifications and averaged less than 2% emulsion and water. Observations made during this plant test indicated that an excess amount of chemical had been used and subsequent plant tests demonstarted that this oil could be treated using as little as 12 pints of chemical per 24 hours which is a treating ratio of 800 barrels of net oil per gallon of chemical.

The treating ratio with the commercial chemical used previously was 1 gallon of chemical to 300 barrels of net oil.

The demulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to in the examples is sulfur dioxide ($SO_2$) extract. This material is a byproduct from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and have been successfully used in breaking water-in-oil petroleum emulsions in the Mid-Continent oil fields, including Oklahoma, Illinois, Kansas, the Gulf coast, Louisiana, Southwest Texas and California.

The term "organic dicarboxy acid" is intended to cover the dicarboxy acids and their anhydrides which hydrolyze to the acid in the presence of water, e.g., diglycolic acid, phthalic acid, phthalic anhydride, maleic acid, maleic anhydride, succinic acid, malic acid, adipic acid and homologues thereof.

This applications is a division of our copending application Serial No. 187,824, filed September 30, 1950, now abandoned.

The invention is hereby claimed as follows:

1. The product of the reaction at 150–300° C. of castor oil, an organic dicarboxy acid and a polyoxyalkylene compound having an average molecular weight between about 1700 and 7500 from the group consisting of glycols and monoethers of glycols in which the oxyalkylene groups consist essentially of oxyethylene and oxypropylene groups and the weight ratio of oxyethylene to oxypropylene is at least 1:4 and not greater than 4:1, the molar ratio of dicarboxy acid to castor oil being at least 1:3 and the molar ratio of the polyoxyalkylene compound to castor oil being at least 1:3.

2. The product of the reaction at 150–300° C. of castor oil, an organic dicarboxy acid and a polyoxyalkylene glycol having an average molecular weight between about 1700 and 7500 in which the oxyalkylene groups consist essentially of oxyethylene and oxypropylene groups and the weight ratio of oxyethylene to oxypropylene is at least 1:4 and not greater than 4:1, the product of reaction being formed by first reacting the dicarboxy acid and the castor oil at a molar ratio of at least 1:3, respectively, at 150–300° C. with the elimination of the water of reaction and thereafter reacting the resulting product with said polyoxyalkylene compound at 150–300° C. with the elimination of the water of reaction at a molar ratio of the polyoxyalkylene compound to the castor oil in the castor oil-dicarboxy acid reaction product of at least 1:3, respectively.

3. The product of the reaction at 150–300° C. of castor oil, an organic dicarboxy acid and a polyoxyalkylene glycol monoether having an average molecular weight between about 1700 and 7500 in which the oxyalkylene groups consist essentially of oxyethylene and oxypropylene groups and the weight ratio of oxyethylene to oxypropylene is at least 1:4 and not greater than 4:1, the product of reaction being formed by first reacting the dicarboxy acid and the castor oil at a molar ratio of at least 1:3, respectively, at 150–300° C. with the elimination of the water of reaction and thereafter reacting the resulting product with said polyoxyalkylene compound at 150–300° C. with the elimination of the water of reaction at a molar ratio of the polyoxyalkylene compound to the castor oil in the castor oil-dicarboxy acid reaction product of at least 1:3, respectively.

4. The product of the reaction at 150–300° C. with the elimination of the water of reaction of castor oil, diglycolic acid and a polyoxyalkylene compound having an average molecular weight between about 1700 and 7500 from the group consisting of glycols and monoethers of glycols in which the oxyalkylene groups consist essentially of oxyethylene and oxypropylene groups and the weight ratio of oxyethylene to oxypropylene is at least 1:4 and not greater than 4:1, the product of reaction being formed by first reacting the diglycolic acid and the castor oil at a molar ratio of at least 1:3, respectively, at 150–300° C. with the elimination of the water of reaction and thereafter reacting the resulting product with said polyoxyalkylene compound at 150–300° C. with the elimination of the water of reaction at a molar ratio of the polyoxyalkylene compound to the castor oil in the castor oil-diglycolic acid reaction product of at least 1:3, respectively.

5. The product of the reaction at 150–300° C. with the elimination of the water of reaction of castor oil, diglycolic acid and a polyoxyalkylene glycol having an average molecular weight between about 1700 and 7500 in which the oxyalkylene groups consist essentially of oxyethylene and oxypropylene groups and the weight ratio of oxyethylene to oxypropylene is at least 1:4 and not greater than 4:1, the product of reaction being formed by first reacting the diglycolic acid and the castor oil at a molar ratio of at least 1:3, respectively, at 150–300° C. with the elimination of the water of reaction and thereafter reacting the resulting product with said polyoxyalkylene glycol at 150–300° C. with the elimination of the water of reaction at a molar ratio of polyoxyalkylene glycol to the castor oil in the castor oil-diglycolic acid reaction product of at least 1:3, respectively.

6. The product of the reaction at 150–300° C. with the elimination of the water of reaction of castor oil, diglycolic acid and a polyoxyalkylene glycol monoether having an average molecular weight between about 1700 and 7500 in which the oxyalkylene groups consist essentially of oxyethylene and oxypropylene groups and the weight ratio of oxyethylene to oxypropylene is at least 1:4 and not greater than 4:1, the product of reaction being formed by first reacting the diglycolic acid and the castor oil at a molar ratio of at least 1:3, respectively, at 150–300° C. with the elimination of the water of reaction and thereafter reacting the resulting product with said polyoxyalkylene glycol monoether at 150–300° C. with the elimination of the water of reaction at a molar ratio of the polyoxyalkylene glycol monoether to the castor oil in the castor oil-diglycolic acid reaction product of at least 1:3, respectively.

7. The product of the condensation with the elimination of water of castor oil, an organic dicarboxy acid and a polyoxyalkylene compound having an average molecular weight between about 1700 and 7500 from the group consisting of glycols and monoethers of glycols in which the oxyalkylene groups consist essentially of oxyethylene and oxypropylene groups and the weight ratio of oxyethylene to oxypropylene is within the range of 1:4 to 4:1, the molar ratio of the dicarboxy acid to castor oil being at least 1:3 and the molar ratio of the polyoxyalkylene compound to castor oil being at least 1:3.

8. The product of the condensation with the elimination of water of castor oil, an organic dicarboxy acid and a polyoxyalkylene compound from the group consisting of glycols and monoethers of glycols in which the oxyalkylene groups consist essentially of oxyethylene and oxypropylene groups and the weight ratio of oxyethylene to oxypropylene is within the range of 1:4 to 4:1, the average molecular weight of said product attributable to said polyoxyalkylene compound being at least 1700, the molar ratio of the dicarboxy acid to castor oil being at least 1:3 and the molar ratio of the polyoxyalkylene compound to castor oil being at least 1:3.

9. The product of the condensation with the elimination of water of castor oil, an organic dicarboxy acid and a polyoxyalkylene compound from the group consisting of glycols and monoethers of glycols in which the oxyalkylene groups consist essentially of oxyethylene and oxypropylene groups and the weight ratio of oxyethylene to oxypropylene is within the range of 1:4 to 4:1, the average molecular weight of said polyoxyalkylene compound being within the range from 1700 to 7500, the molar ratio of the dicarboxy acid to castor oil being at least 1:3 and the molar ratio of the polyoxyalkylene compound to castor oil being at least 1:3.

10. The product of the condensation with the elimination of water of castor oil, an organic dicarboxy acid and a monoether of a polyoxyalkylene glycol in which the oxyalkylene groups consist essential of oxyethylene and oxy-1,2-propylene groups and the weight ratio of oxyethylene to oxy-1,2-propylene is within the range of 1:4 to 4:1, the average molecular weight of said product attributable to said polyoxyalkylene glycol monoether being within the range from 1700 to 7500, the molar ratio of the dicarboxy acid to castor oil being at least 1:3 and the molar ratio of the polyoxyalkylene compound to castor oil being at least 1:3.

11. The product of the condensation with the elimination of water of castor oil, an organic dicarboxy acid and a polyoxyalkylene glycol in which the oxyalkylene groups consist essentially of oxyethylene and oxy-1,2-propylene groups and the weight ratio of oxyethylene to oxy-1,2-propylene is within the range of 1:4 to 4:1, the average molecular weight of said product attributable to said polyoxyalkylene glycol being within the range from 1700 to 7500, the molar ratio of the dicarboxy acid to castor oil being at least 1:3 and the molar ratio of the polyoxyalkylene glycol to castor oil being at least 1:3.

12. The product of the condensation with the elimination of water of castor oil, diglycolic acid and a polyoxyalkylene compound from the group consisting of glycols and monoethers of glycols in which the oxyalkylene groups consist essentially of oxyethylene and oxypropylene groups and the weight ratio of oxyethylene to oxypropylene is within the range of 1:4 to 4:1, the average molecular weight of said polyoxyalkylene compound being within the range from 1700 to 7500, the molar ratio of the diglycolic acid to castor oil being at least 1:3 and the molar ratio of the polyoxyalkylene compound to castor oil being at least 1:3.

13. The product of the condensation with the elimination of water of castor oil, diglycolic acid and a monoether of a polyoxyalkylene glycol in which the oxyalkylene groups consist essentially of oxyethylene and oxy-1,2-propylene groups and the weight ratio of oxyethylene to oxy-1,2-propylene is within the range of 1:4 to 4:1, the average molecular weight of said product attributable to said polyoxyalkylene glycol monoether being within the range from 1700 to 7500, the molar ratio of the diglycolic acid to castor oil being at least 1:3 and the molar ratio of the polyoxyalkylene glycol to castor oil being at least 1:3.

14. The product of the condensation with the elimination of water of castor oil, diglycolic acid and a polyoxyalkylene glycol in which the oxyalkylene groups consist essentially of oxyethylene and oxy-1,2-propylene groups and the weight ratio of oxyethylene to oxy-1,2-propylene is within the range of 1:4 to 4:1, the average molecular weight of said product attributable to said polyoxyalkylene glycol being within the range from 1700 to 7500, the molar ratio of the diglycolic acid to castor oil being at least 1:3 and the molar ratio of the polyoxyalkylene glycol to castor oil being at least 1:3.

References Cited in the file of this patent

UNITED STATES PATENTS

| | | |
|---|---|---|
| 2,295,163 | De Groote et al. | Sept. 8, 1942 |
| 2,505,824 | De Groote et al. | May 2, 1950 |
| 2,576,285 | De Groote et al. | Nov. 27, 1951 |
| 2,677,700 | Jackson et al. | May 4, 1954 |
| 2,695,909 | Smith | Nov. 30, 1954 |